United States Patent [19]

Anders

[11] 4,401,421
[45] Aug. 30, 1983

[54] APPARATUS FOR GRANULATING PLASTICS MATERIAL OR PLASTIC COMPOSITIONS

[75] Inventor: Dietmar Anders, Hanover, Fed. Rep. of Germany

[73] Assignee: Hermann Berstorff Maschinenbau GmbH, Hanover, Fed. Rep. of Germany

[21] Appl. No.: 371,136

[22] Filed: Apr. 23, 1982

[30] Foreign Application Priority Data

Apr. 23, 1981 [DE] Fed. Rep. of Germany ....... 3116153

[51] Int. Cl.³ ............................................. B29C 25/00
[52] U.S. Cl. ..................................... 425/71; 264/142; 425/311; 425/313
[58] Field of Search ................................. 264/142, 8; 425/313–314, 311, 67, 71

[56] References Cited

U.S. PATENT DOCUMENTS

| 2,439,772 | 4/1948 | Gow | 264/8 |
| 3,415,917 | 12/1968 | Watanabe et al. | 425/313 |
| 4,025,252 | 5/1977 | Hunke | 425/67 |
| 4,245,972 | 1/1981 | Anders | 425/67 |
| 4,300,877 | 11/1981 | Andersen | 425/313 |
| 4,385,884 | 5/1983 | Pecci et al. | 425/313 |

Primary Examiner—Jay H. Woo
Attorney, Agent, or Firm—Schwartz, Jeffery, Schwaab, Mack, Blumenthal & Koch

[57] ABSTRACT

A granulation apparatus which operates in the manner of a water-ring granulator comprises a perforated plate and rotatable cutter tool for granulating material fed through the plate. A recess is provided beneath the perforated plate which is concentric with, but inwardly of, a collection chamber for collecting the granulated material. The recess is dimensioned so as to have a cross-sectional area at least equal to the surface area of the plate.

4 Claims, 3 Drawing Figures

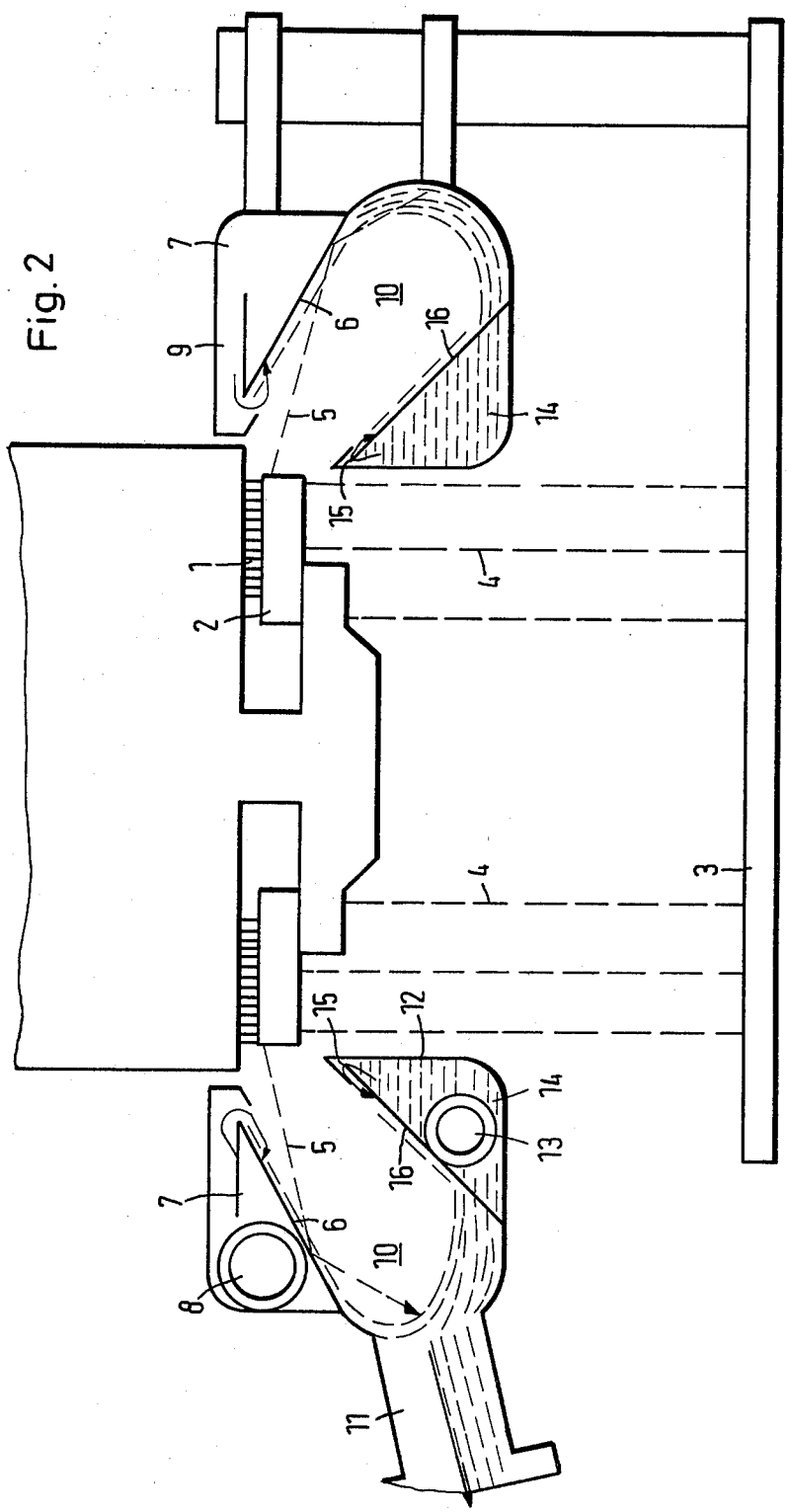

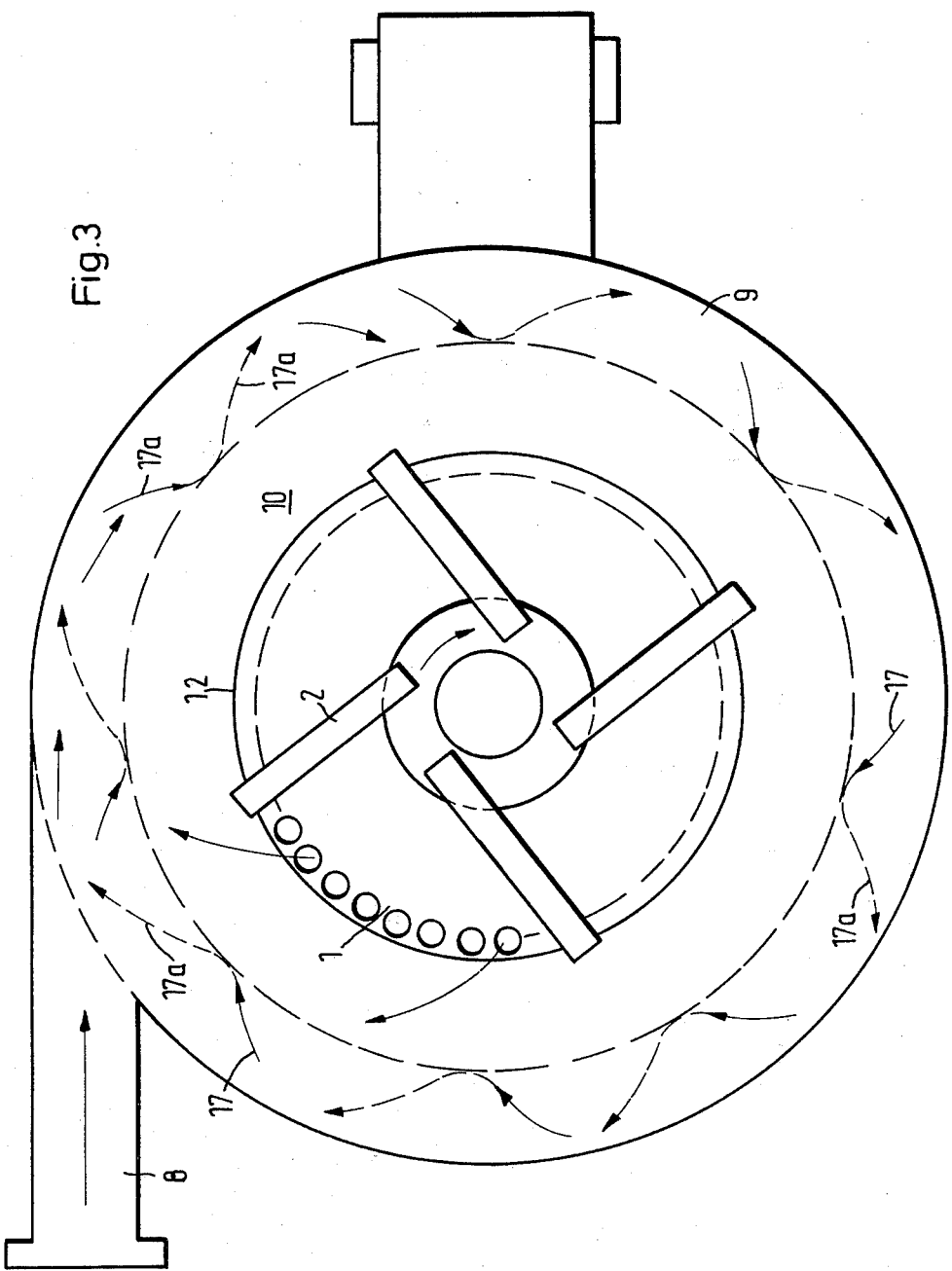

APPARATUS FOR GRANULATING PLASTICS MATERIAL OR PLASTIC COMPOSITIONS

FIELD OF THE INVENTION

The present invention relates to an apparatus for granulating fused or molten masses of plastics material or plastic compositions.

BACKGROUND OF THE INVENTION AND DISCUSSION OF PRIOR ART

A known apparatus for this purpose includes a perforated plate through which the material is extruded and a multi-vaned or bladed rotary cutting tool which is mounted in front of, that is to say, downstream the plate. The cutting tool comprises a cutter holder and cutter blades. The cutting tool is surrounded by a chamber for collecting the cut granulated material. The chamber has, in use, a coolant liquid flowing therethrough.

In a further known apparatus for granulating fused or molten masses of plastics material or similar plastic compositions, there is provided a housing for collecting the cut granulated material and both the granulated material and the coolant water are discharged centrally from the housing.

When the apparatus is started up, the cutters cannot be used because the extruded strands may not have yet reached their full thickness or, alternatively, strands may not yet have emerged from all of the holes in the perforated plate. It is therefore necessary, at least initially, to pass the strands through the plate into the chamber without being cut. It is therefore necessary to collect the uncut strands from the base of the chamber and to discharge them. Long individual strands, or strands which have become stuck together, very quickly cause the central discharge bore in the chamber to become blocked and, in consequence, result in considerable operational disruption of the apparatus.

OBJECTS OF THE INVENTION

The present invention seeks, therefore, to provide an apparatus for granulating fused or molten masses of plastics material or similar plastic compositions, in which the hereinbefore described problem associated with the commencement of operation of the granulation apparatus is overcome. The prevention of blockage of the granulated material discharge aperture, which causes operational disruptions, is also sought to be achieved by the apparatus of the present invention.

SUMMARY OF THE INVENTION

According to the present invention, there is provided an apparatus for granulating fused or molten masses of plastics material or plastic compositions comprising a perforated plate through which, in use, material to be granulated is fed a rotatable cutting tool for cutting material which has passed through the perforated plate, the cutting tool comprising a cutter holder and a plurality of cutter blades, the tool being surrounded by a chamber for collecting granules formed by the action of the cutters, the chamber having means for wetting the surface thereof associated therewith, a continuous recess being formed beneath the perforated plate, which recess is concentric with the chamber for collecting the granules but is located inwardly of said chamber, the cross-sectional area of the recess being at least equal to the surface area of the perforated plate.

Preferably, the recess is formed by a conical or cylindrical sleeve, the minimum diameter of the sleeve being at least equal to the diameter of the perforated plate.

Because a continuous recess which is concentric with the collection chamber for the granules but which is located inwardly thereof is provided, which recess is preferably in the form of a cylindrical sleeve, and because the recess is so dimensioned that its cross-section is at least equal to the surface area of the perforated plate, the problems normally associated with the commencement of a granulation operation appear to have been overcome. Uncut strands are merely allowed to drop into this recess and cannot enter the chamber for collecting the granules. Consequently, operational disruptions resulting from a blocked outlet in the granule collection chamber do not occur. By providing a mirror beneath the recess, the granulation process can, if desired or necessary, be observed and controlled.

If the rotating cutters are then actuated, the cut granules are subjected to a centrifugal force which impels then outwardly into the collection chamber. From the chamber, the granules can be collected and discharged by means of a stream of coolant water.

In order to ensure that the collection surfaces are covered with a circulating film of water, an annular channel may be disposed around the upper, outer surface of the collection chamber, the annular channel having a tangential water inlet aperture through which water is fed into the channel. An acceleration chamber for the water may be provided in the upper region of the annular channel, which acceleration chamber is flat and annular and extends from the outer peripheral region of the annular channel to the inner peripheral region thereof. The annular channel and the acceleration chamber communicate with one another, in such a case, through an annular aperture formed in the outer peripheral region of the annular channel. In turn, the acceleration chamber may communicate with the chamber for collecting the granules through an annular aperture provided in the inner peripheral region of the annular chamber.

The advantage of supplying the coolant water in this manner is that the water, which is fed tangentially into the annular channel at high speed, is subjected to high centrifugal acceleration. Whilst the water is flowing through the annular channel, the fastest moving water will move to the upper outer peripheral region of the channel. This fast flowing water thus enters the plate-like, annular acceleration chamber. In the acceleration chamber, the coolant liquid is subjected to further angular acceleration due to the fact that the acceleration chamber is of smaller dimensions than the annular chamber. Accordingly, the angular velocity of the water increases whilst its absolute speed remains constant.

The thus-accelerated coolant liquid, which has a high centrifugal force, then passes over the inner edge of the acceleration chamber into the granule collection chamber. Freed from the contriction of the acceleration chamber, and the pressure of water upstream thereof, the water is thrown outwardly by the centrifugal force onto the wall of the collection chamber which, desirably, is inclined downwardly and outwardly. A granulation apparatus including such a water supply arrangement is described and claimed in co-pending Patent Application Ser. No. 371,435, in the names of the present applicant and Jurgen Voight.

In the case of a collector housing having a conical or cylindrical recess coaxially formed therewith but inwardly thereof, the radially inner wall of the housing, that is to say the outer wall of the recess, may also be covered with a uniform film of water. This is to prevent reflected granules from adhering to the wall, especially if highly adhesive materials are being granulated.

For this purpose, a second annular channel, also having a tangential coolant water inlet, may be provided. This second annular channel is disposed around the lower, inner edge of the collection chamber and the inner edge of the channel forms the outer surface of the recess or sleeve. At its upper end, an annular aperture is provided in the channel, an encircling, downwardly-extending deflection plate being provided to direct the water overflowing from the channel.

If the internal surface of the granule collection chamber is designed in this manner, the inner wall of the chamber is also covered with a film of water of a uniform thickness, so that materials which have a strong tendency to adhere thereto are prevented from doing so. Accordingly, such materials may be easily granulated without causing any disruptions in the process.

BRIEF DESCRIPTION OF THE DRAWINGS

Two embodiments of the present invention will be described in greater detail, by way of example, with reference to the accompanying drawings, in which:

FIG. 2 is a schematic sectional view through a second embodiment of an apparatus in accordance with the present invention, and FIG. 3 is a schematic cross-sectional view taken along the line III—III of FIG. 1.

DESCRIPTION OF PREFERRED EMBODIMENTS

Figure 1:
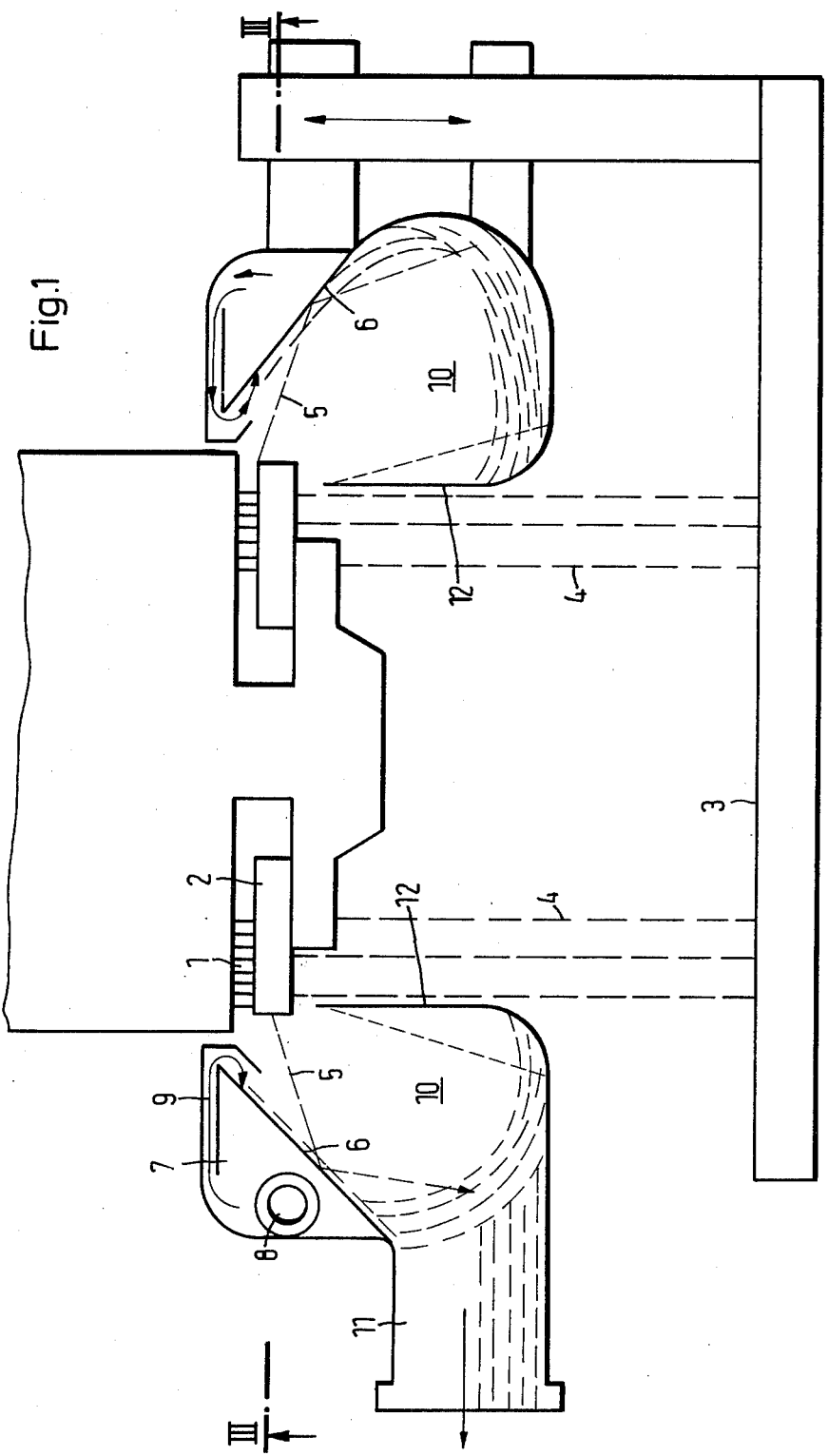
FIG. 1 is a schematic sectional view through a first embodiment of an apparatus in accordance with the present invention.

Referring now to the drawings and, in particular, FIG. 1, fused or molten masses of plastics material or similar plastic compositions are extruded through the apertures in a perforated plate 1 and are cut to form granules by means of a rotary cutter tool 2. The plate 1 has portions (not shown) which are not perforated.

In the initial phase of the operation of the apparatus, the cutter blades of the cutter tool are rotated into the perforation-free regions of the perforated plate 1, so that the extruded material can pass through the perforations in the plate in an unhindered manner. Until the extrusion device is operating at full power and strands 4 of extruded material of full thickness are extruded at an appropriate pressure through all of the perforations in the plate 1, the cutter blades are maintained in their initial position. The strands 4 therefore pass unhindered to a base plate 3 of the apparatus, from which they may be easily removed, without disrupting the subsequent granulation operation.

The cutter tool 2 is then actuated. The rotation of the blades of the cutter tool not only granulates the material but also supplies a centrifugal force thereto, as shown by the arrows 5. This centrifugal force directs the granules onto the lower wall 6 of an annular channel 7 and not onto the base plate 3. This wall 6 also forms the upper wall of a collection chamber 10 for the granules, which chamber 10 will be described in greater detail hereinafter.

The lower wall 6 is wetted by a film of coolant water which is produced in the annular channel 7. For this purpose, water is fed tangentially into the annular channel 7 through a coolant water inlet aperture 8.

As the water circulates in the annular channel 7, the portion thereof having the highest speed of angular rotation will move outwardly and upwardly to the upper, outer peripheral region of the channel 7. Such fastest flowing water then passes into a plate-like annular acceleration chamber 9 formed in the upper region of the channel 7.

In the chamber 9, the water is forced to move inwardly from the outer to the inner periphery of the annulus by the pressure of the water flow. Due to the restricted diameter of the chamber 9 compared with that of the channel 7, the water is subjected to substantial angular acceleration in the acceleration chamber 9. Accordingly after emerging from the chamber 9, the water is no longer constrained to move radially inwardly and, on entering the interior of the chamber 10, tends to remain close to the wall 6. The film of water having this high centrifugal acceleration will circulate around the wall 6. The granules cut by the cutter tool 2 are impelled into this film of water and are removed from the apparatus through an outlet aperture 11.

The recess for receiving the initial uncut strands 4 is formed concentrically with the chamber 10 and located radially inwardly thereof and defined by a cylindrical sleeve 12 which comprises the radially inner wall of the collection chamber.

The sleeve 12 is, in the above embodiment, cylindrical, but it could equally be conical, as shown in dashed lines in FIG. 1. However, it is highly desirable that the smallest cross-sectional area of the cylinder or of the cone is selected so as to be at least equal to the surface area of the perforated plate. This is to ensure that, when the cutter tool 2 is not rotating, all of the emergent strands 4 passing through the plate 1 are discharged downwardly into the recess.

Elliptical, rectangular or any other suitably shaped perforated plates may also be utilised. The recess is, in such circumstances, adapted to the shape of the plate.

In FIG. 2, an embodiment of an apparatus in accordance with the present invention is shown which is particularly suitable for granulating highly adhesive materials. For this purpose, a second annular channel 14 is provided, the radially inner wall of which forms the wall of the sleeve 12. The channel 14 has a downwardly and outwardly inclined outer wall 16 which forms a wall portion of the chamber 10. Water is caused to enter the channel 14 through an inlet opening 13. This water then overflows from the top of the channel 14 into the chamber 10, the overflow edge of the channel being referenced 15. The water entering the chamber 10 circulates and will remain adjacent the wall 16 due to gravity. Such water therefore prevents highly adhesive granules from adhering to the internal wall 16 of the chamber 10.

FIG. 3 is a cross-sectional view of the embodiment shown in FIG. 1 and illustrates, in particular, the circulation of the water streams in both the acceleration chamber 9 and in the chamber 10 in the region of the wall 6. More particularly, the arrows 17 indicate the direction travel of the water in the chamber 9 due to the centrifugal acceleration caused by the relative dimension of the chamber 9 and the channel 7 being overcome by the upstream water pressure and the arrows 17a indicate the centrifugal acceleration of the water onto the wall 6 of the chamber 10 when freed from the contraints of the chamber 9.

LIST OF REFERENCE NUMERALS

1 = perforated plate
2 = cutting tool
3 = base plate
4 = strands of material
5 = arrows
6 = lower wall of channel 7 and outer wall of collection chamber 10
7 = annular channel for coolant water p1 8 = coolant water inlet aperture
9 = acceleration chamber for coolant water
10 = chamber for collecting the granules
11 = outlet aperture from chamber 10
12 = sleeve or surface of a recess for collecting ungranulated material
13 = second inlet aperture for coolant water
14 = second annular channel for coolant water
15 = overflow edge of channel 14
16 = inner wall of chamber 10 and outer wall of channel 14
17 = arrows indicating direction of water flow in chamber 9
17a = arrows indicating direction of water flow in chamber 10

I claim:

1. Apparatus for granulating fused or molten masses of extruded plastics material, comprising:
    (a) feed means for said material, including a perforated plate through which material in extruded, strand form passes.
    (b) rotatable cutter means positioned downstream of said perforated plate, said cutter means including a cutter holder and a plurality of cutter blades mounted on said holder, said blades being adapted to be rotated out of alignment with said perforations during start up of the apparatus and into alignment with said perforations for cutting the strands during the granulating process,
    (c) collection chamber means for collecting the granulated material, said chamber means including a downwardly and outwardly inclined wall against which the granulated material impacts, and a radially inner wall which defines a central opening which throughout its length is at least equal to or greater than the dimension of the peripheral surface of said perforated plate, whereby during start up of the apparatus strands can pass downwardly through said central opening and not be directed into said collection chamber, and
    (d) water feed means located adjacent said collection chamber means, said water feed means including means for centrifugally accelerating the water as a result of which the water passes over said outwardly and downwardly inclined wall surface of said collection chamber means to carry away said granulated material.

2. The apparatus of claim 1 wherein said radially inner wall of said collection chamber comprises an annular cylindrical sleeve which defines the inner limits of said collection chamber means.

3. The apparatus of claim 1 wherein said radially inner wall of said collection chamber means is conical, tapering downwardly and outwardly from its upper end.

4. The apparatus of claim 1 wherein said collection chamber means include an upper channel partially defined by said downwardly and outwardly inclined wall, and a second annular channel positioned below said first channel, said second channel including a radially inner wall which defines said central opening, a downwardly and outwardly inclinded wall which defines, with said first recited downwardly and outwardly inclined wall, an annular collection chamber for the granulated material, and means for supplying water to said second channel to consequently form a film of water passing over said downwardly and outwardly inclined wall of said second channel, whereby highly adhesive granules are precluded from adhering to said inclined wall of said second channel.

5. Apparatus for granulating fused or molten masses of extruded plastics material, comprising:
    (a) feed means for said material, including a perforated plate having perforations through which material is extruded, strand form pass,
    (b) rotatable cutter means positioned downstream of said perforated plate, said cutter means including a cutter holder and a plurality of cutter blades mounted on said holder, said blades being adapted to be rotated into alignment with said perforations for cutting the strands during the granulating process,
    (c) collection chamber means for collecting the granulated material, said chamber means including a downwardly and outwardly inclined wall surface against which the granulated material impacts, the radially innermost portion of said chamber means being of a diameter approximately the same as or greater than the diameter of the radially outermost perforations of said perforated plate, whereby during start up strands can pass unrestricted downwardly and not be retained in said collection chamber, and
    (d) water feed means located adjacent said collection chamber means, said water feed means including a channel and means for supplying water under pressure to said channel, as a result of which the water passes over said outwardly and downwardly inclined wall surface of said collection chamber means to carry away said granulated articles.

6. The apparatus of claim 5 wherein said innermost portion of said chamber means comprises an inner annular wall which defines an annulus the inside of which is at least equal to the diameter of the radially outermost perforations of said perforated plate.

* * * * *